(12) United States Patent
Takahashi et al.

(10) Patent No.: US 7,509,940 B2
(45) Date of Patent: Mar. 31, 2009

(54) MARINE ENGINE

(75) Inventors: Masanori Takahashi, Shiznoka-ken (JP); Yoshibumi Iwata, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/571,423

(22) PCT Filed: Sep. 29, 2005

(86) PCT No.: PCT/JP2005/018031

§ 371 (c)(1),
(2), (4) Date: Nov. 20, 2007

(87) PCT Pub. No.: WO2006/035909

PCT Pub. Date: Apr. 6, 2006

(65) Prior Publication Data

US 2008/0065306 A1    Mar. 13, 2008

(30) Foreign Application Priority Data

Sep. 29, 2004    (JP) .............................. 2004-284414

(51) Int. Cl.
*F02P 5/00*        (2006.01)
*G06F 19/00*    (2006.01)

(52) U.S. Cl. .................................. 123/406.28; 701/114

(58) Field of Classification Search ............ 123/406.26, 123/406.28, 406.33; 701/103, 114, 115
See application file for complete search history.

(56) References Cited

U.S. PATENT DOCUMENTS

| 5,675,072 | A | * | 10/1997 | Yasuda et al. ............... 73/35.08 |
| 5,755,206 | A | * | 5/1998 | Takahashi et al. ....... 123/406.37 |
| 5,959,192 | A | * | 9/1999 | Mogi et al. ................. 73/35.08 |
| 5,979,406 | A | * | 11/1999 | Aoki et al. ............. 123/406.37 |
| 6,118,276 | A | * | 9/2000 | Nakata et al. ................ 324/464 |
| 7,062,373 | B2 | * | 6/2006 | Takahashi et al. ........... 701/114 |
| 2003/0006774 | A1 | | 1/2003 | Ohkama et al. |
| 2003/0183195 | A1 | | 10/2003 | Uchida et al. |
| 2004/0245085 | A1 | * | 12/2004 | Srinivasan ............. 204/157.15 |

FOREIGN PATENT DOCUMENTS

| JP | 11-107897 | 4/1999 |
| JP | A-2000-027723 | 1/2000 |
| JP | 200080944 | 3/2000 |
| JP | A-2000-064938 | 3/2000 |
| JP | 2001329905 | 11/2001 |
| JP | 200246689 | 2/2002 |
| JP | 200321034 | 1/2003 |
| JP | 2003286932 | 10/2003 |

* cited by examiner

*Primary Examiner*—John T Kwon
(74) *Attorney, Agent, or Firm*—Knobbe Martens Olson & Bear LLP (57) ABSTRACT

A marine engine is arranged such that it compares a detected ion current value with a predetermined sea water-ingress current value, which is indicative of sea water being present in the combustion chamber at the time of combustion.

15 Claims, 6 Drawing Sheets

MARINE ENGINE

RELATED APPLICATIONS

This application is a U.S. National Phase of International Application No. PCT/JP2005/018031, filed Sep. 29, 2005, which claims the benefit of Japanese Application No. 2004-284414, filed Sep. 29, 2004, both of which are hereby incorporated by reference in their entirety.

BACKGROUND OF THE INVENTION

1. Field of the Invention

This invention generally relates to internal combustion engines and more particularly relates to marine engines capable of detection of sea water infiltrating into its combustion chamber.

2. Description of the Related Art

Because water is more likely to be mixed in fuel used for the driving of the engine in watercraft outboard motors than in motor vehicles, due to the condition of use in which the watercraft run on the water in the sea or a river, and because the engine function might be damaged if water is mixed in the fuel, there has been provided a device for detecting water infiltrating a fuel tank or the like. The goal is to prevent possible damage to the engine.

As devices for detecting such ingress of water, systems have been known which are disclosed in JP-A-2000-27723 and JP-A-2000-064938. In JP-A-2000-27723, reference is made to a fuel filter disposed in a fuel feed system in a marine engine, wherein said fuel filter comprises a filter body; a filter case mounted detachably to the filter body; a filter material disposed in the filter case; and a float type water detection sensor disposed below the filter material.

According to this patent document, it is stated that this device does not lower separating properties of water due to vibration, and the water level can be detected exactly.

On the other hand, in JP-A-2000-064938, reference is made to an ion current detection device for internal combustion engines comprising ion current measurement means for measuring an ion current in response to the number of ions produced by a mixture burning in a cylinder of the internal combustion engine; humidity detection means for detecting the humidity of the atmosphere; and correction means for correcting the ion current value measured by the ion current measurement means in response to the humidity detected by the humidity detection means.

According to this patent document, it is stated that an ion current value exactly reflecting the burning condition can be detected irrespective of humidity fluctuations.

However, since in the invention described in JP-A-2000-27723, the float provided in the fuel filter moves during operation of the watercraft on the water, the float type water detection sensor might malfunction and provide false detection of an infiltration of sea water, even when there has been no infiltration of water.

In the invention described in JP-A-2000-064938, it is stated that when a mixture is burned in a cylinder of an internal combustion engine, the ion current in the cylinder is measured to judge the air fuel ratio. However, it does not disclose judging from the ion current measurement whether or not there has been an infiltration of sea water in a marine engine.

SUMMARY OF THE INVENTION

In view of the foregoing, an object of this invention is to provide a marine engine allowing an early and reliable judgment that sea water has been mixed in the fuel.

Another object of this invention is to provide an outboard motor capable of urging a driver to take action before the marine engine has been significantly damaged, when sea water has been mixed in the fuel.

In order to achieve the foregoing object, a marine engine can comprise ion current detection means for detecting as an ion current value the number of ions produced by a mixture burning in a combustion chamber of the marine engine. The marine engine also can comprise sea water-ingress judgment means for comparing the ion current value detected by the ion current detection means with a predetermined sea water-ingress current value, which represents the value when sea water is present in the combustion chamber, to determine if sea water has infiltrated the engine.

Warning means can be provided to inform a driver of the detection of sea water infiltration when it is determined by the sea water-ingress judgment means that there has been a sea water infiltration.

Burning condition judgment means can be provided to judge a burning condition in the combustion chamber based on the ion current value detected by the ion current detection means. Engine control means also can be provided for performing engine control based on the judgment results from the burning condition judgment means. When the ion current value exceeds the sea water-ingress current value, the engine control based on the ion current value can be stopped.

Because there is provided sea water-ingress judgment means for comparing an ion current value detected by ion current detection means with a sea water-ingress current value, it will be judged from the ion current value whether sea water has been mixed in the fuel, which enables reliable judgment, with little risk of malfunction, of whether or not there has been an ingress of sea water. Because burning fuel mixed with sea water make the ion current take a different value compared with the ion current value when normal fuel is burned in the combustion chamber, judgment can be made of whether or not there has been an ingress of sea water.

Because warning means is provided for informing a driver of an infiltration of sea water, mixing of sea water in the fuel can be checked by the driver earlier. Thus, the driver will be able to take early action before damage to the marine engine due to sea water becomes greater.

Because there are provided burning condition judgment means for judging a burning condition in the combustion chamber based on the ion current value detected by the ion current detection means, and engine control means for performing engine control based on judgment results by the burning condition judgment means, when the ion current exceeds a sea water-ingress current value, engine control based on the ion current value can be stopped. Thus, continued engine control based on an abnormal ion current value can be prevented.

BRIEF DESCRIPTION OF THE DRAWINGS

The abovementioned and other features, aspects and advantages of the inventions disclosed herein are described in detail below with reference to the drawings of the preferred embodiments. The illustrated embodiments are intended to illustrate, but not to limit the inventions. The drawings contain the following figures:

FIG. 6($a$) and FIG. 6($b$) are graphs showing measurement results of the ion current value, wherein FIG. 6($a$) is a view when there has been no ingress of sea water, and FIG. 6($b$) is a view when there has been an ingress of sea water.

DETAILED DESCRIPTION OF THE PREFERRED EMBODIMENT

With reference to FIG. 1 through FIG. 6, an embodiment that is arranged and configured in accordance with certain features, aspects and advantages of the present invention will be described below.

Figure 1:
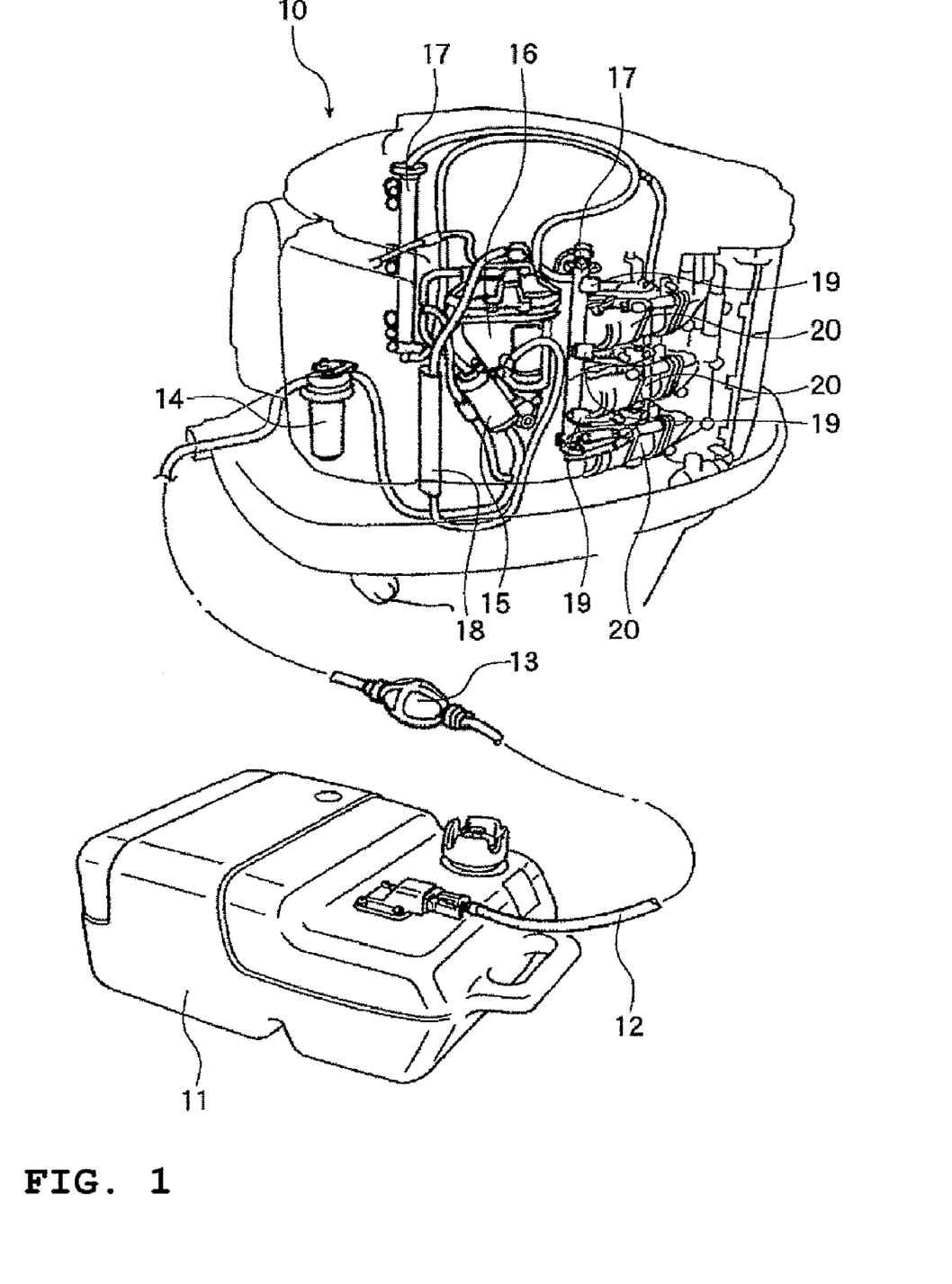
FIG. 1 is a schematic view of a combustion system of a marine engine that is arranged and configured in accordance with certain features, aspects and advantages of the present invention.

With reference to FIG. 1, a fuel feed path of an outboard motor 10 preferably communicates via a pipe 12 with a fuel tank 11. The fuel tank 11 can be disposed in a hull outside the outboard motor. Along the pipe 12 is disposed a priming pump 13 for feeding by hand fuel from the fuel tank 11 to a marine engine 9 (see FIG. 3) before starting.

Inside the outboard motor 10, there preferably are provided a fuel filter 14 for filtering fuel passing through the pipe 12 and a low pressure fuel pump 15 for pumping the filtered fuel at a low pressure. Further provided in the outboard motor 10 are a vapor separator 16 having a built-in high pressure fuel pump. The vapor separator 16 is provided to separate vapor from fuel. The outboard motor 10 also comprises fuel rails 17 for left and right banks through which separated fuel circulates, a fuel cooler 18 for cooling the circulating fuel, and injectors 19 that are provided on intake pipes 20. Preferably, one injector is provided to each intake pipe 20 and the injectors 19 inject fuel into the engine for combustion.

Figure 2:
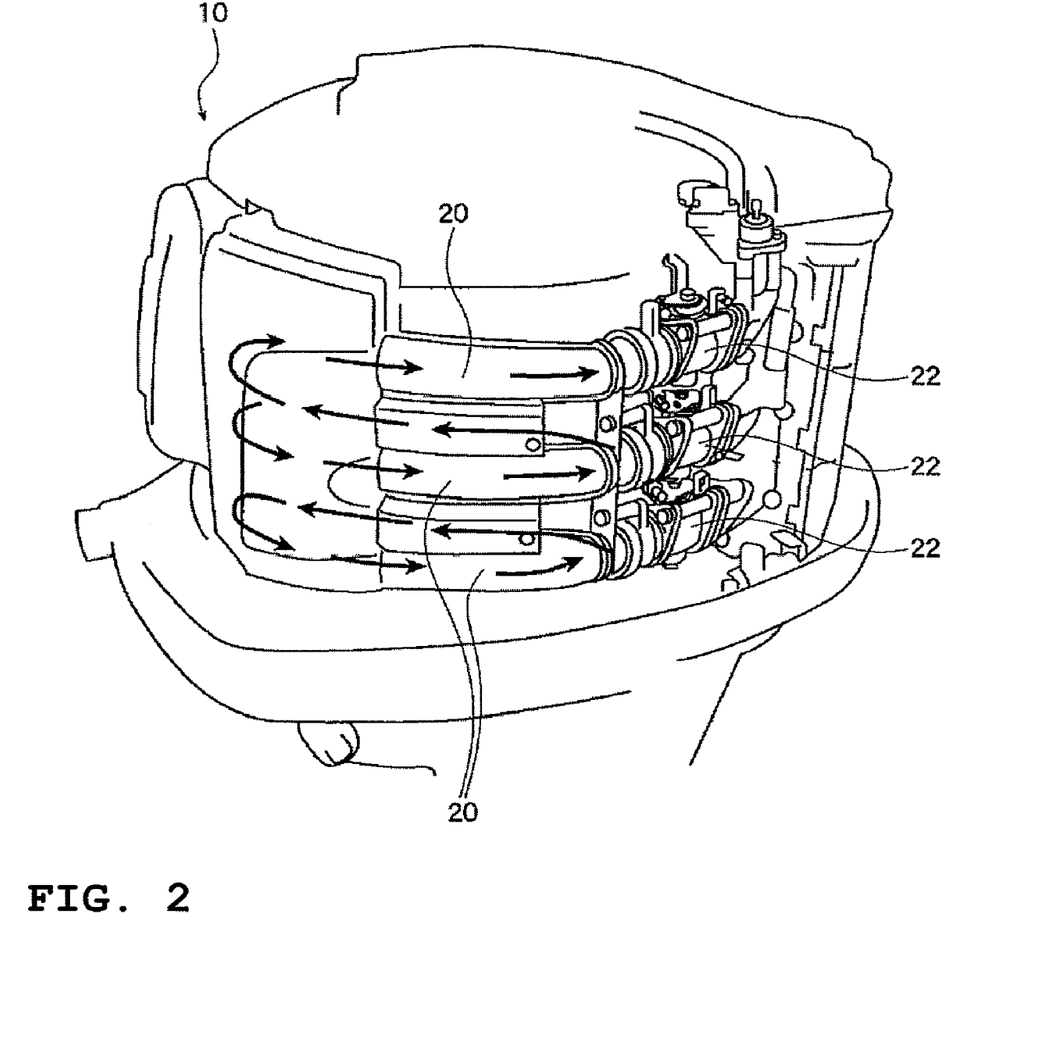
FIG. 2 is a schematic view of an intake system of the marine engine of FIG. 1.
Figure 3:
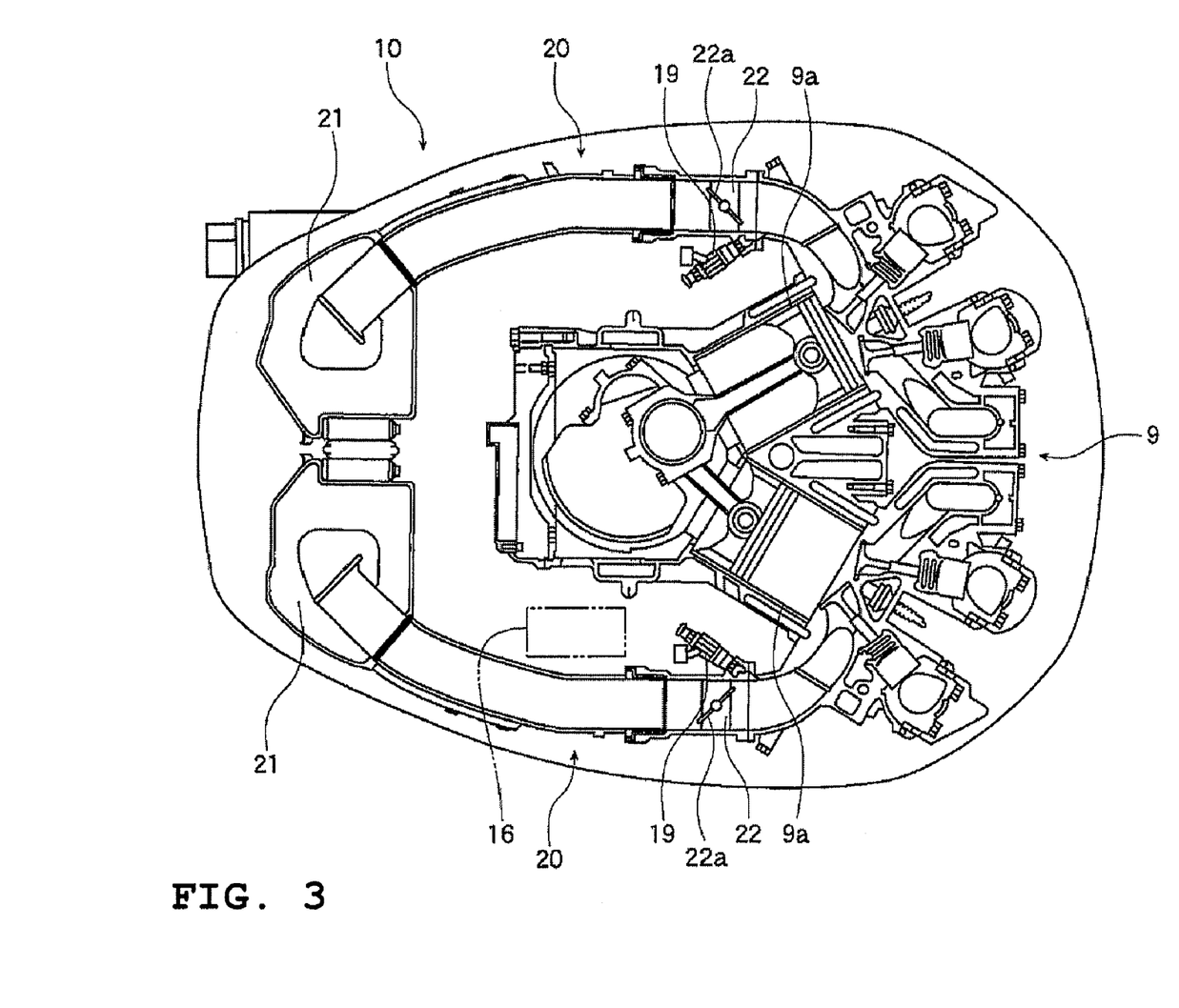
FIG. 3 is another schematic view of the intake system of the marine engine of FIG. 1.

The intake pipe 20, as shown in FIG. 2 and FIG. 3, connects with an intake chamber 21 at one end and connects with a throttle body 22 having a throttle valve 22$a$ on the cylinder 9$a$ end. Air drawn from the intake pipe 20 is mixed with fuel injected from the injector 19 to form a mixture, which is delivered to a combustion chamber 38 (see FIG. 5) inside the marine engine 9 to be combusted.

Figure 4:
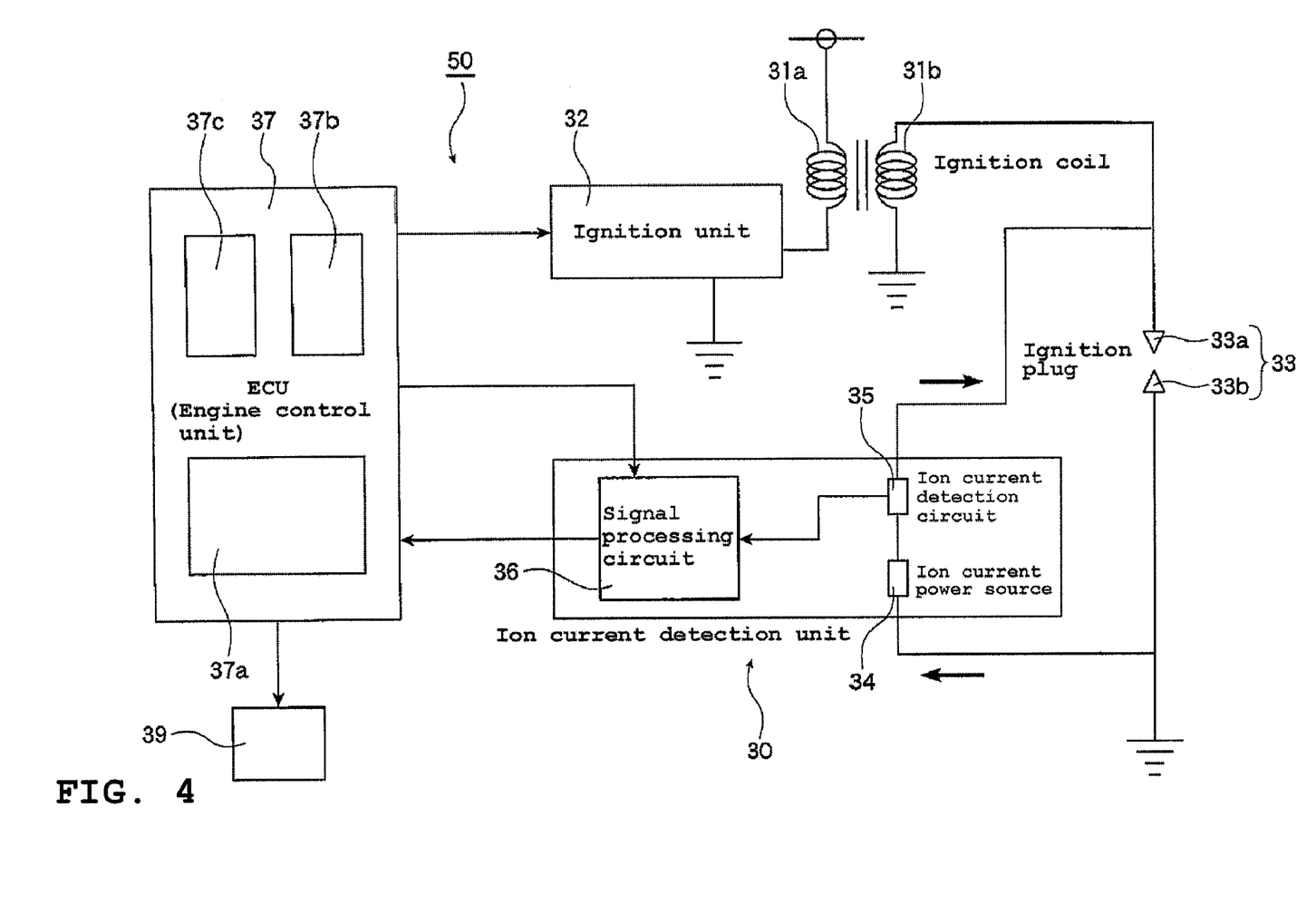
FIG. 4 is a block diagram showing schematically a procedure for the detection of an ion current, which procedure is arranged and configured in accordance with certain features, aspects and advantages of the present invention.

The marine engine 9 in the outboard motor 10 preferably is provided with an ion current system 50, as shown in FIG. 4 by the block diagram illustrating a circuit structure. The ion current system 50 preferably comprises an ion current detection unit 30 and an engine control unit 37. The illustrated ion current detection unit 30 is provided with an ion current power source 34, an ion current detection circuit 35 as ion current detection means for detecting an ion current in the combustion chamber 38 (see FIG. 5), and a signal processing circuit 36 for processing information from the ion current detection circuit 35. The illustrated engine control unit 37 is provided with sea water-ingress judgment means 37$a$, burning condition judgment means 37$b$, and engine control means 37$c$.

The sea water-ingress judgment means 37$a$ preferably compares the ion current value I detected by the ion current detection circuit 35 with a predetermined sea water-ingress current value $I_1$, which is the value representative of sea water having infiltrated the combustion chamber 38, to judge whether or not there has been an ingress of sea water.

When an ignition signal is sent to an ignition unit 32 from the engine control unit 37 in the control system provided with the ion current system 50, a current flows in a primary winding 31$a$ of an energized ignition coil, which current is cut off to induce a high voltage in a secondary winding 31$b$ of the ignition coil, and in turn a spark discharge occurs on an ignition plug 33. That is, as shown in FIG. 4, a high positive voltage is applied to a center electrode 33$a$ of the ignition plug 33, so that a spark discharge occurs between the center electrode 33$a$ and a combustion chamber wall 33$b$.

Figure 5:
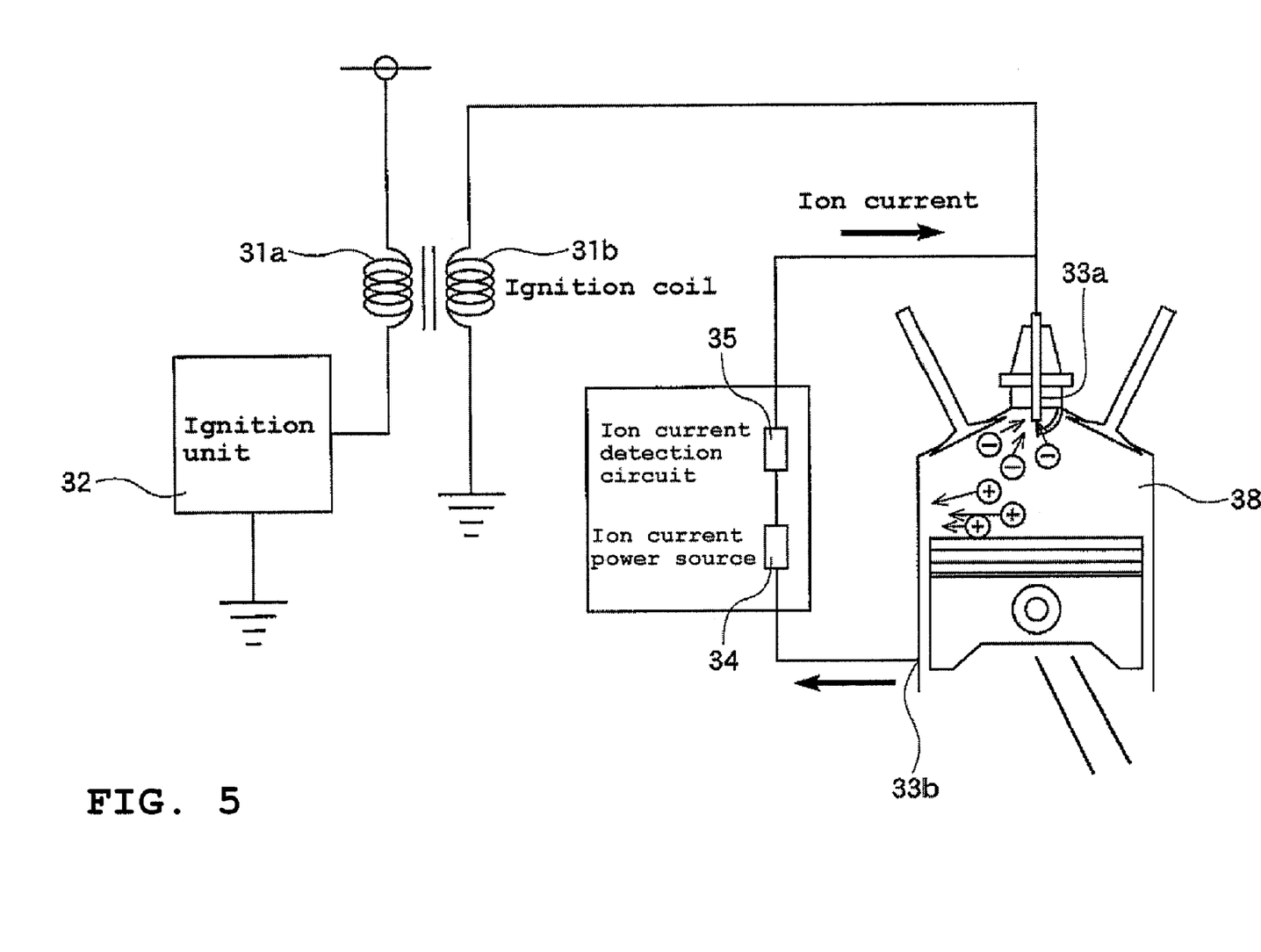
FIG. 5 is a view showing ions moving in a combustion chamber of the marine engine.

When the spark discharge occurs on the ignition plug 33, a mixture in the combustion chamber 38 ignites and burns such that the mixture is ionized, as shown in FIG. 5, with the result that the space between the center electrode 33$a$ of the ignition plug 33 and the combustion chamber wall 33$b$ becomes conductive. Because, in this condition, a voltage is applied by an ion current power source 34 between the center electrode 33$a$ of the ignition plug 33 and the combustion chamber wall 33$b$, minus ions are attracted to the center electrode 33$a$ in the combustion chamber 38 and plus ions are attracted to the combustion chamber wall 33$b$, causing an ion current flow. That is, as shown in FIG. 5, the ion current flows from a positive electrode of the ion current power source 34, through the ion current detection circuit 35, the center electrode 33$a$ and the combustion chamber wall 33$b$ to a negative electrode of the ion current power source 34.

Detection results of the ion current in the combustion chamber 38 detected by the ion current detection circuit 35 are sent to a signal processing circuit 36, and when the ion current value I detected by the ion current detection circuit 35 is compared with the ion current value $I_1$ indicative of sea water infiltration and it is judged that there has been an ingress of sea water, the fact of the ingress of sea water is transmitted to the engine control unit 37.

Figure 6:
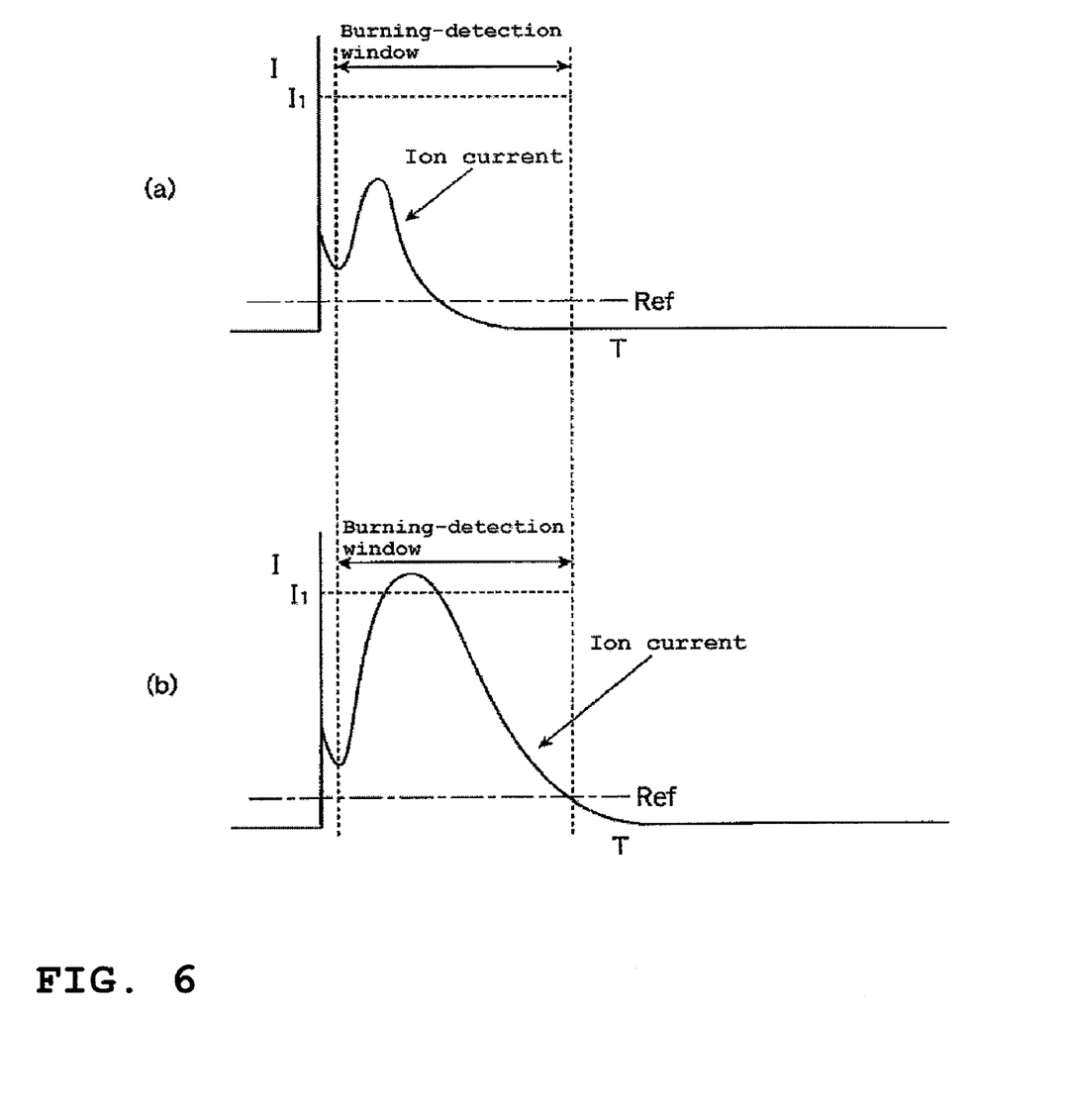

An example of the detected waveform of the ion current when there has been no ingress of sea water is represented as shown in FIG. 6($a$), while an example of the detected waveform of the ion current when there has been an ingress of sea water is represented by a given higher value than the predetermined sea water-ingress current value, which defines a threshold value representative of the ingress of sea water into the combustion chamber 38.

The engine control unit 37 is adapted to light a sea water-ingress warning lamp 39 as warning means provided in a meter to inform a driver of the sea water infiltration when it is judged that there has been an infiltration of sea water.

The sea water-ingress warning lamp 39 is provided with a plurality of kinds of warnings corresponding to the degree of ingress of sea water judged from the ion current value I. In one configuration, in a display panel provided in a hull (not shown), instructions are issued to the driver that he should operate a water separating device (not shown). The fact of whether or not there has been a sea water infiltration, and the frequency of the ingress of sea water, can be stored in a self diagnosis system. The plurality of kinds of warnings corresponding to the degree of sea water infiltration are arranged such that they differ in the lighting range of the sea water-ingress warning lamp 39 or in the magnitude of loudness of sounds from an audible alarm, for example.

Further, the engine control unit 37 is capable of performing engine control based on the detected ion current value I, such as knock control, ignition timing control or fuel injection control. In this case, the engine control unit 37 is arranged such that if the ion current value I takes an abnormal value, control of the marine engine 9 based on the ion current value I is stopped. That is, the engine control unit 37 is provided with burning condition judgment means 37b for judging a burning condition in the combustion chamber 38 based on the ion current value I detected by the ion current detection circuit 35, and engine control means 37c for performing engine control based on judgment results of the burning condition judgment means 37b. The burning condition judgment means 37b judges the burning condition in the combustion chamber 38 based on the ion current value I detected by the ion current detection circuit 35, the engine control means 37c controls the operating conditions of the marine engine 9 based on judgment results of the burning condition judgment means 37b, and when the ion current value I detected by the ion current detection circuit 35 exceeds a sea water-ingress current value $I_1$, control of the marine engine 9 based on the ion current value I is stopped.

Therefore, the engine control unit 37 stops knock control performed based on the ion current value I detected by the ion current detection circuit 36 and switches engine control, such as fuel injection control performed based on the ion current value I, to a control not using the ion current value I.

According to the outboard motor 10 as described above, because there is provided sea water-ingress judgment means for comparing the ion current value I detected by the ion current detection circuit 35 with the sea water-ingress current value $I_1$, to judge the ingress of sea water, ingress of sea water into the marine engine 9 is detected from the ion current value I, allowing reliable detection of sea water infiltration with little risk of malfunction.

Further, since the sea water-ingress judgment means 37a is provided with a sea water-ingress warning lamp 39 for informing the driver of ingress of sea water when it is judged that there has been an ingress of sea water, the driver is allowed to check mixing of sea water in the fuel earlier, enabling the driver to take early action before damage to the marine engine 9 due to sea water becomes greater.

Further, because when it is judged by the burning condition judgment means 37b that the ion current value I exceeds the sea water-ingress current value $I_1$, control of the marine engine 9 based on the ion current value I is stopped or switched by the engine control means 37c, which stops continued control of the marine engine 9 based on an abnormal ion current value.

Further, mixing of sea water in the fuel can be detected without need of adding other means or parts, which results in cost reduction.

Although in the illustrated embodiment, the sea water-ingress judgment means 37a monitors the ingress of sea water from the ion current value I itself, other configurations are possible. For example, the ingress of sea water can be judged using an ion current value I processed in connection with time or the crank angle, or other values processed. The judgment value of the sea water-ingress judgment means 37a may be set not only to a value in one level but also to values in several levels corresponding to the degree of ingress of sea water, or using a coefficient by which the normal value is multiplied. Further, the sea water-ingress judgment means 37a may judge from the relative magnitude of the ion current value I or a processed ion current value when it is compared with a sea water-ingress judgment value, the number of times the ion current value I exceeds the judgment value, the time interval during which it exceeds the judgment value, or the like.

Further, although in the illustrated embodiment, the burning condition judgment means 37b and sea water-ingress judgment means 37a are provided in the engine control unit 37, one or both may be provided in the ion current detection unit 30.

Further, although in the illustrated embodiment, there is provided a sea water-ingress warning lamp 39 to inform the driver of sea water infiltration, other configurations are possible. For instance, other warning lamps indicating abnormalities may be used to alert the driver to the abnormality. Further, although in the illustrated embodiment the driver is urged to take action such that he should operate a water separating device at the time of ingress of sea water, other configurations are possible. For instance, the driver may be urged to take action for a problem related to the water separating device. Furthermore, a plurality of kinds of warning modes may be provided to suit the degree of detected sea water infiltration.

Yet further, although in the illustrated embodiment control of the burning condition judgment means 37b is stopped if there has been sea water infiltration, other configurations are possible. A plurality of control procedures may be provided in response to the degree of the sea water-ingress signal.

Further, although in the illustrated embodiment the sea water-ingress judgment means 37a judges the mixing of sea water if sea water has been mixed in the fuel, other configurations are possible. For instance, even if sea water has been mixed in the intake air inducted from an intake pipe 20, the sea water-ingress judgment means 37a may be adapted to judge the mixing of sea water.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments can be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An engine control system comprising:
   an ion current detection component configured to detect an ion current value representing the number of ions produced by a fuel-air mixture burning in a combustion chamber of the engine; and
   a seawater-ingress judgment component configured to compare a predetermined seawater-ingress current value with the ion current value detected by the ion current detection component to determine whether seawater has infiltrated the combustion chamber.

2. The engine control system of claim 1 further comprising a warning component, the warning component being actuated by the seawater-ingress judgment component in response to a determination of seawater infiltration into the combustion chamber to inform a driver of seawater infiltration into the combustion chamber.

3. The engine control system of claim 1 further comprising:
   a burning condition judgment component configured to judge a burning condition in the combustion chamber based on the ion current value detected by the ion current detection component; and
   an engine control component configured to control the engine based on a burning condition detected by the burning condition judgment component.

4. The engine control system of claim 3 wherein the engine control means ceases to use the ion current value as a basis for engine control when the ion current value exceeds the predetermined seawater-ingress current value.

5. A method of engine control comprising:
   detecting the level of ions produced by a mixture burning in a combustion chamber of an engine;
   generating an ion current value based on the level of ions detected; and
   comparing the ion current value with a predetermined seawater-ingress current value to determine whether seawater has infiltrated the combustion chamber.

6. The method of claim 5 further comprising informing a driver of infiltration of seawater into the combustion chamber.

7. The method of claim 5 further comprising:
   judging a burning condition in the combustion chamber based on the detected ion current value; and
   controlling the engine based on the judgment results.

8. The method of claim 7 wherein controlling the engine comprises ceasing to use the ion current value as a basis for engine control when the ion current value exceeds the predetermined seawater-ingress current value.

9. An engine control system comprising:
   an ion current detection unit being at least partially disposed adjacent a combustion chamber of an engine, the ion current detection unit being operative to detect as an ion current value the number of ions produced by a mixture burning in the combustion chamber; and
   a seawater-ingress judgment unit being in communication with the ion current detection unit to receive the ion current value therefrom, the seawater-ingress judgment unit being operative to compare the ion current value detected by the ion current detection unit with a predetermined seawater-ingress current value to determine ingress of seawater in the combustion chamber.

10. The engine control system of claim 9 further comprising a warning unit being in communication with the seawater-ingress judgment unit, the warning unit being configured to receive an ingress signal from the seawater-ingress judgment unit and to inform a driver of ingress of seawater into the combustion chamber.

11. The engine control system of claim 10 wherein the warning unit provides a visually-perceptible signal to the driver.

12. The engine control system of claim 11 wherein the warning unit is a seawater-ingress warning lamp.

13. The engine control system of claim 9 further comprising:
   a burning condition judgment unit being in communication with at least one of the ion current detection unit and the seawater-ingress judgment unit for receiving the ion current value therefrom, the burning condition judgment unit being operative to judge a burning condition in the combustion chamber based on the ion current value; and
   an engine control unit being in communication with the burning condition judgment unit for performing engine control based on the burning condition judged by the burning condition judgment means.

14. The engine control system of claim 13 wherein the engine control unit utilizes the ion current value as a basis for engine control.

15. The engine control system of claim 14 wherein the engine control unit is configured to cease use of the ion current value as a basis for engine control when the ion current value exceeds the predetermined seawater-ingress current value.

* * * * *